Figure 1:
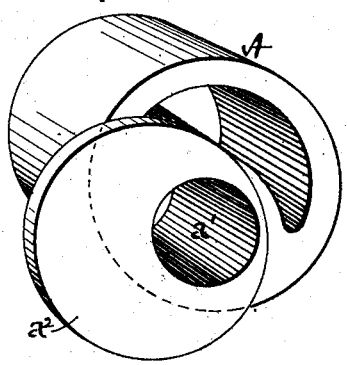

No. 738,252. PATENTED SEPT. 8, 1903.
R. A. STUBBS.
ECCENTRIC OR CAM.
APPLICATION FILED JULY 20, 1901. RENEWED JULY 6, 1903.
NO MODEL.

Witnesses.
Lloyd T. Brunson.
Walter A. Knight.

Inventor.
Riley A. Stubbs
by L. M. Hosea
Atty.

No. 738,253. PATENTED SEPT. 8, 1903.
F. A. SUCK.
TAG STRINGING MACHINE.
APPLICATION FILED NOV. 24, 1902.
NO MODEL. 9 SHEETS—SHEET 2.
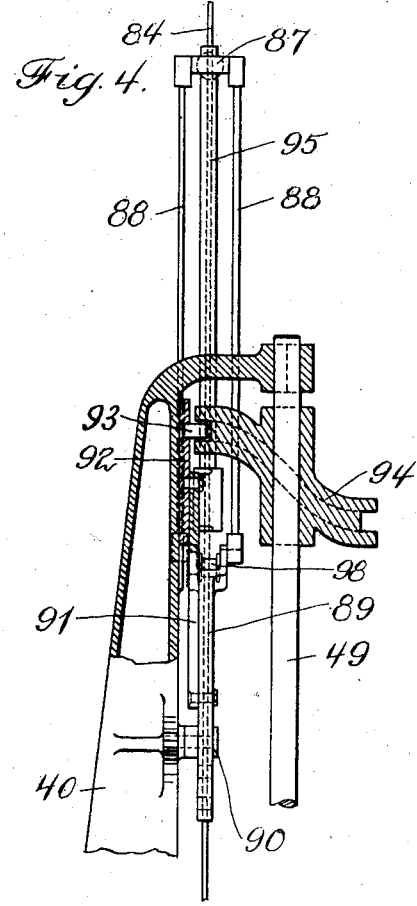
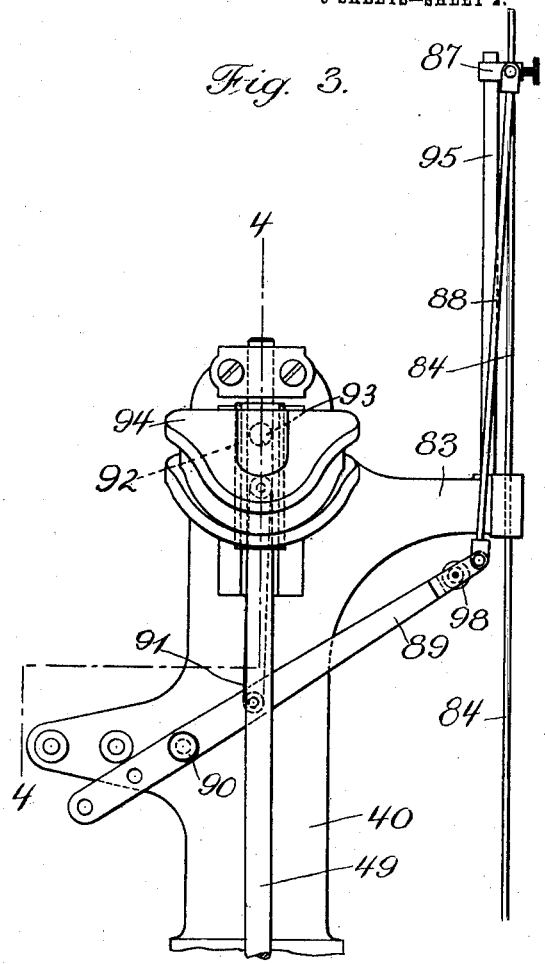
Witnesses.
A. D. Harrison
George D. Hall.
Inventor:
F. A. Suck
by Wright Brown Quimby
his attys No. 738,253. PATENTED SEPT. 8, 1903.
F. A. SUCK.
TAG STRINGING MACHINE.
APPLICATION FILED NOV. 24, 1902.
NO MODEL. 9 SHEETS—SHEET 3.
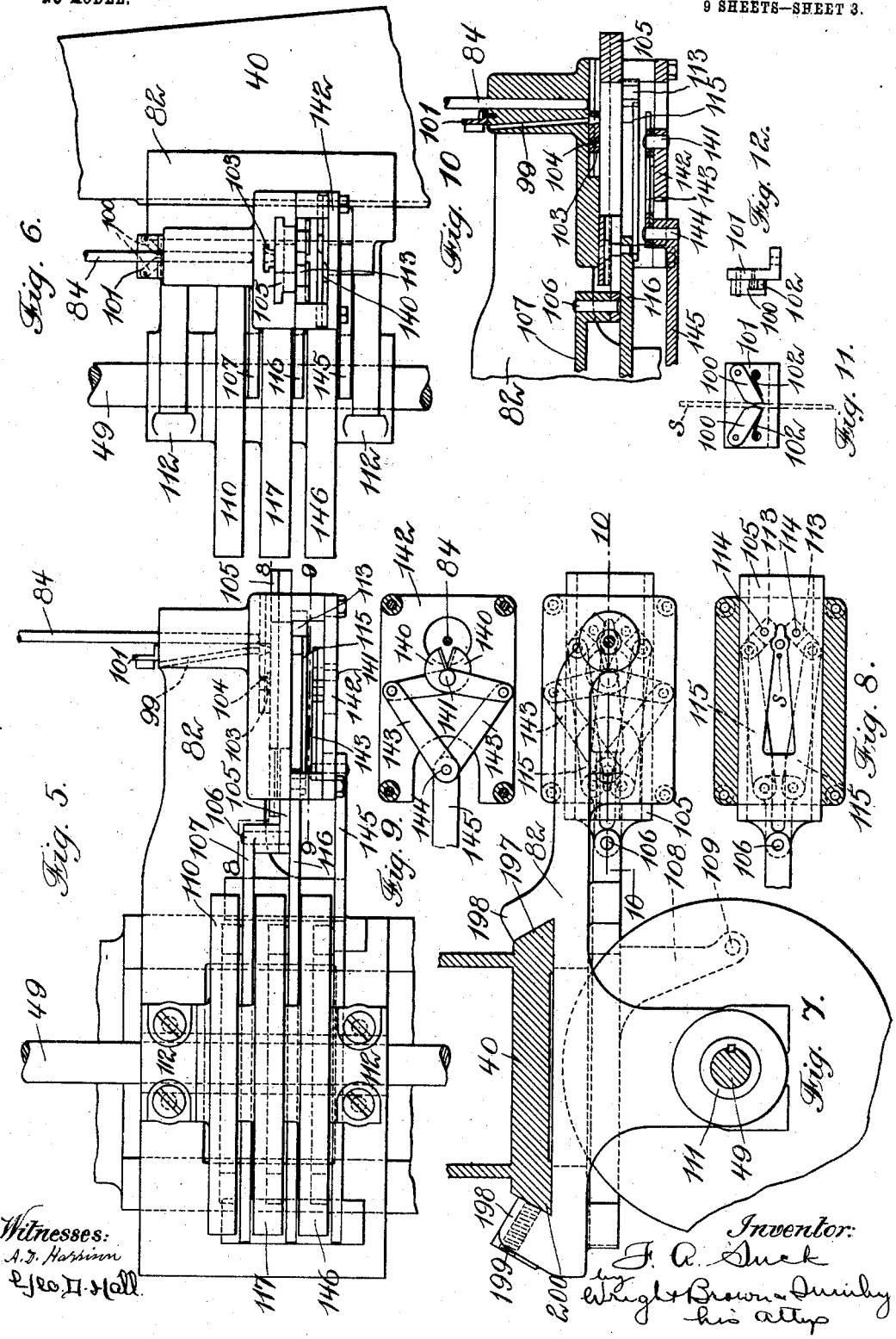
Witnesses:
A. D. Harrison
Geo. H. Hall
Inventor:
F. A. Suck
by Wright Brown & Quinby
his attys

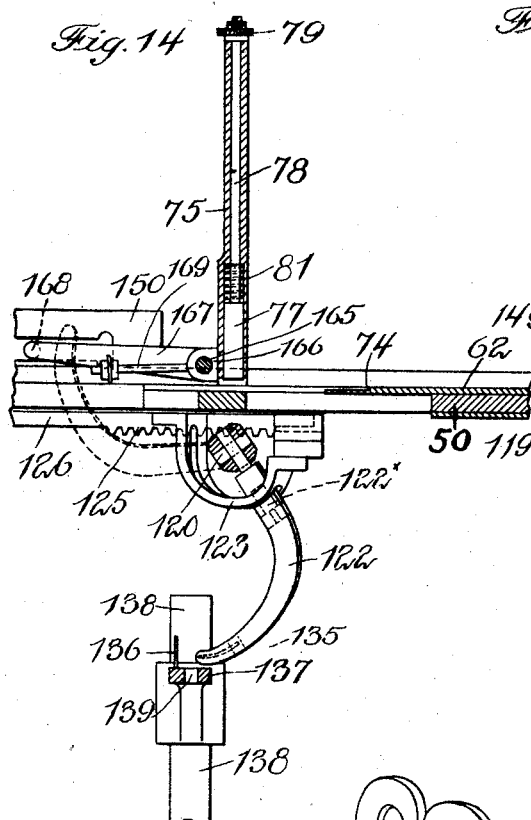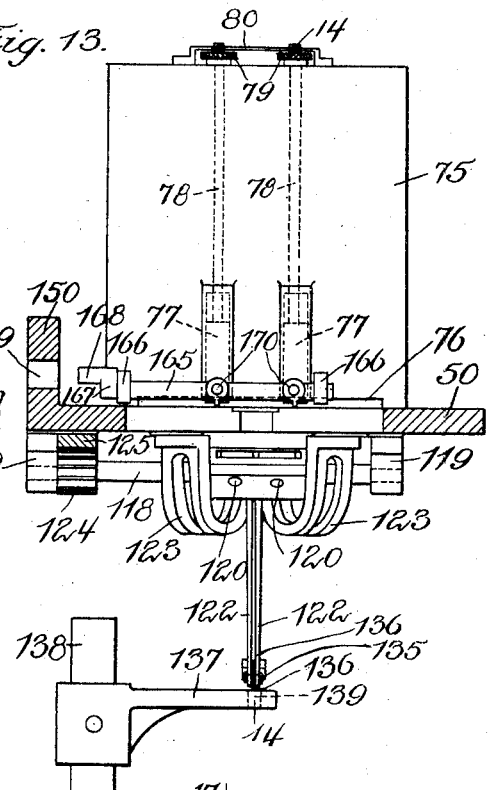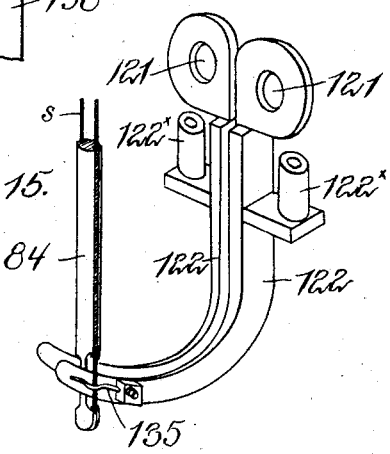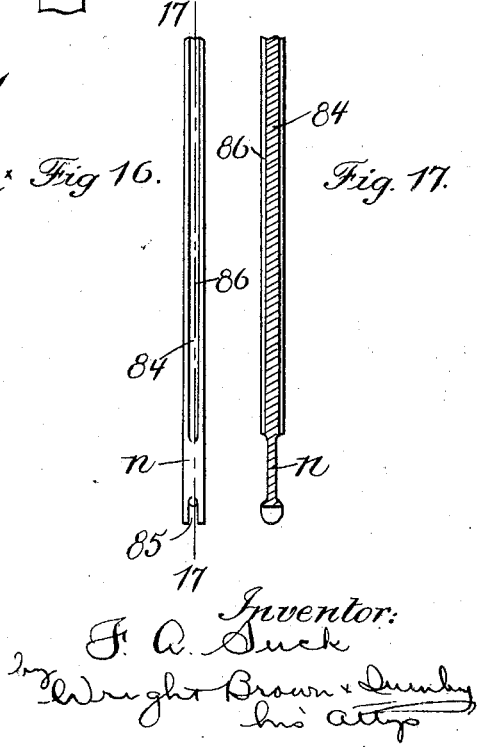

No. 738,253. PATENTED SEPT. 8, 1903.
F. A. SUCK.
TAG STRINGING MACHINE.
APPLICATION FILED NOV. 24, 1902.
NO MODEL. 9 SHEETS—SHEET 5.
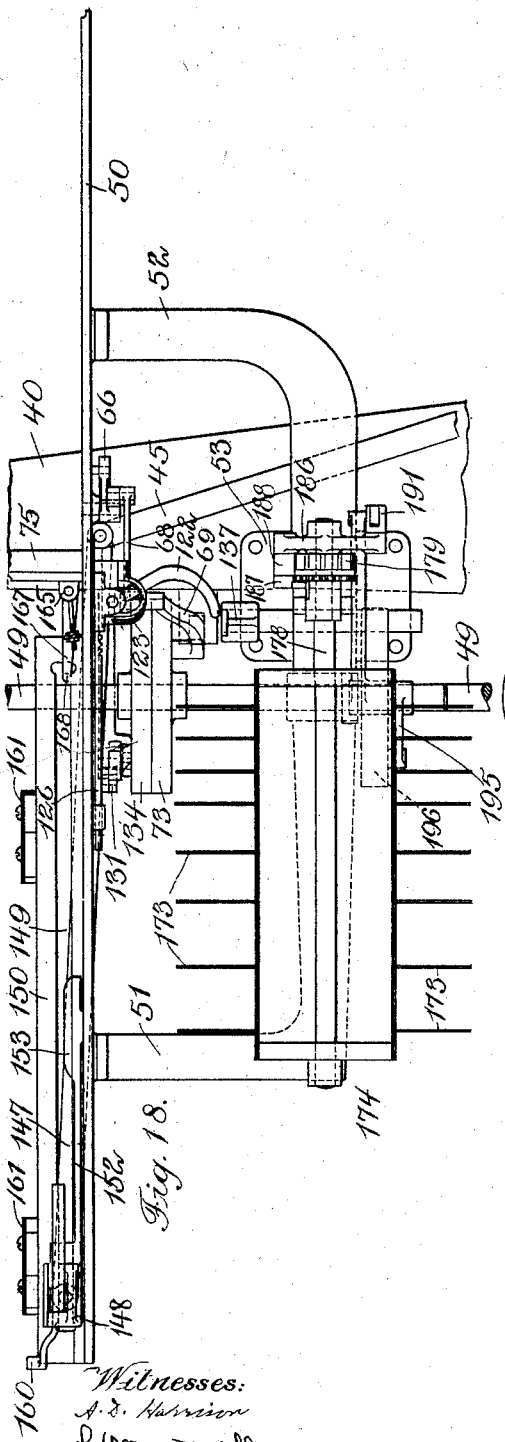
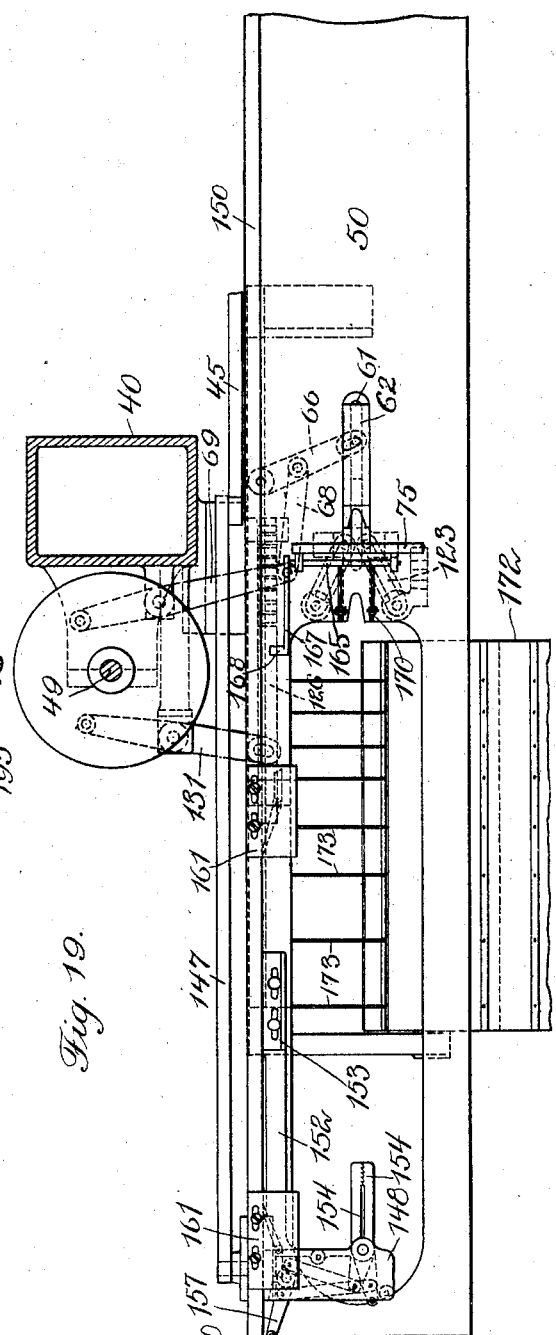
Witnesses: Inventor:
F. A. Suck No. 738,253. PATENTED SEPT. 8, 1903.
F. A. SUCK.
TAG STRINGING MACHINE.
APPLICATION FILED NOV. 24, 1902.
NO MODEL. 9 SHEETS—SHEET 6.
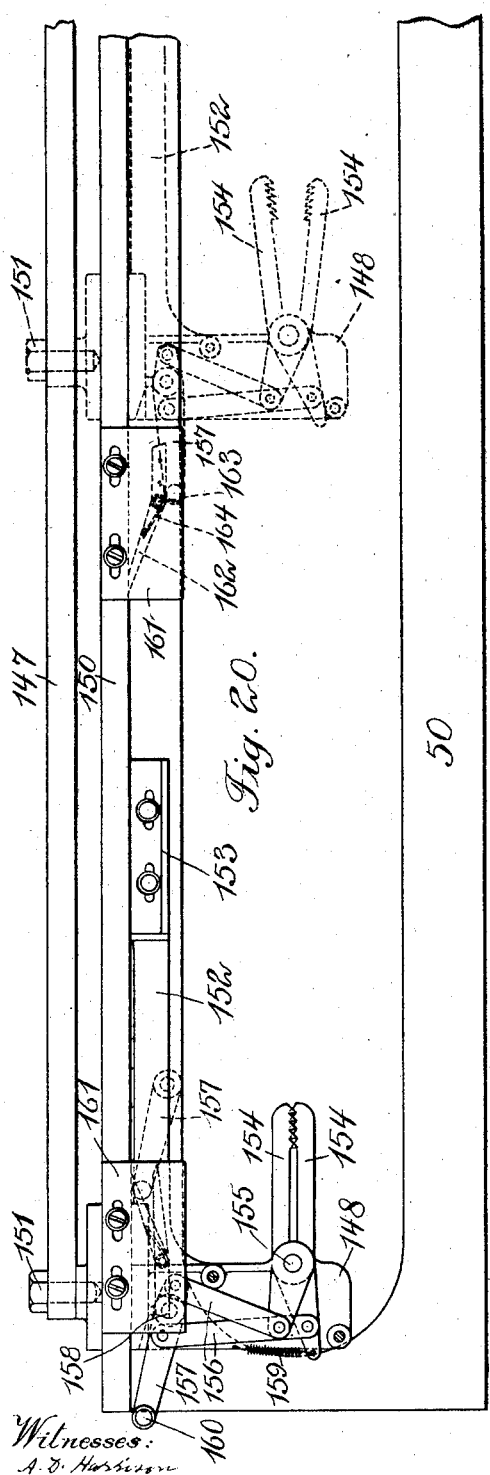
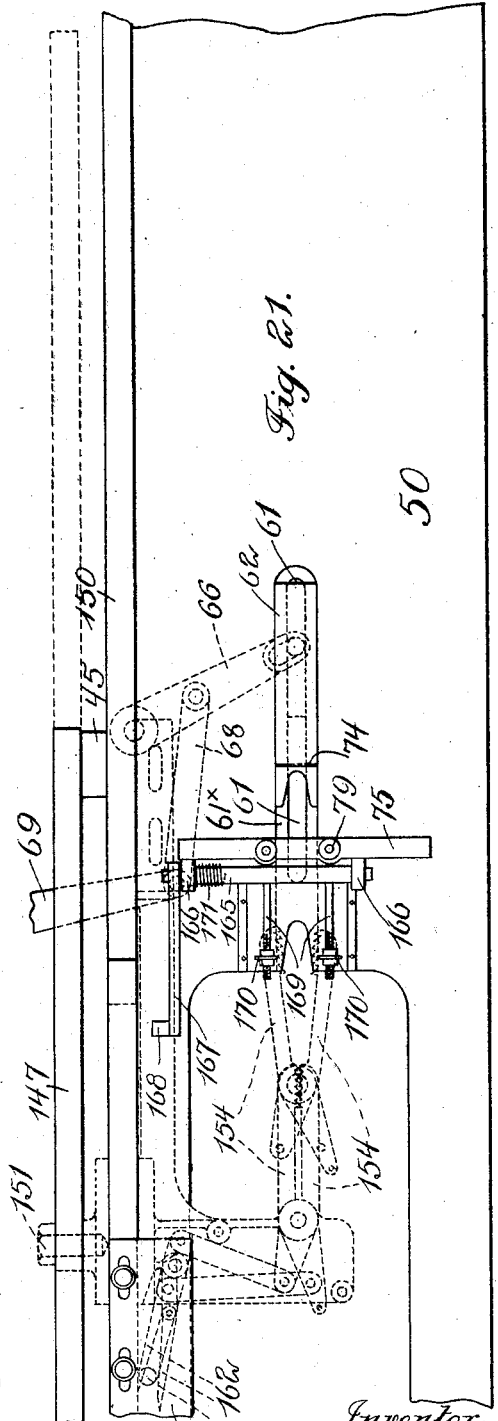

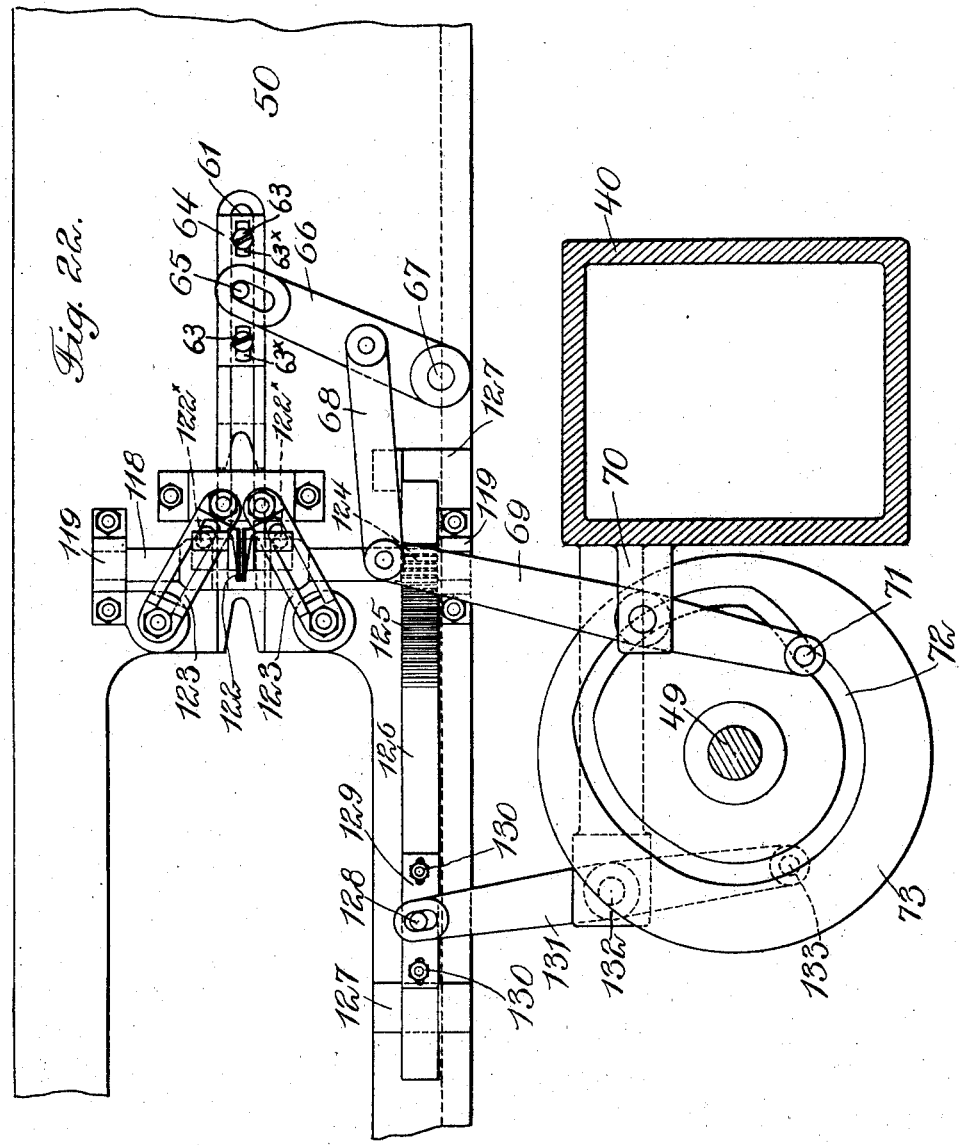

No. 738,253. PATENTED SEPT. 8, 1903.
F. A. SUCK.
TAG STRINGING MACHINE.
APPLICATION FILED NOV. 24, 1902.
NO MODEL. 9 SHEETS—SHEET 8.
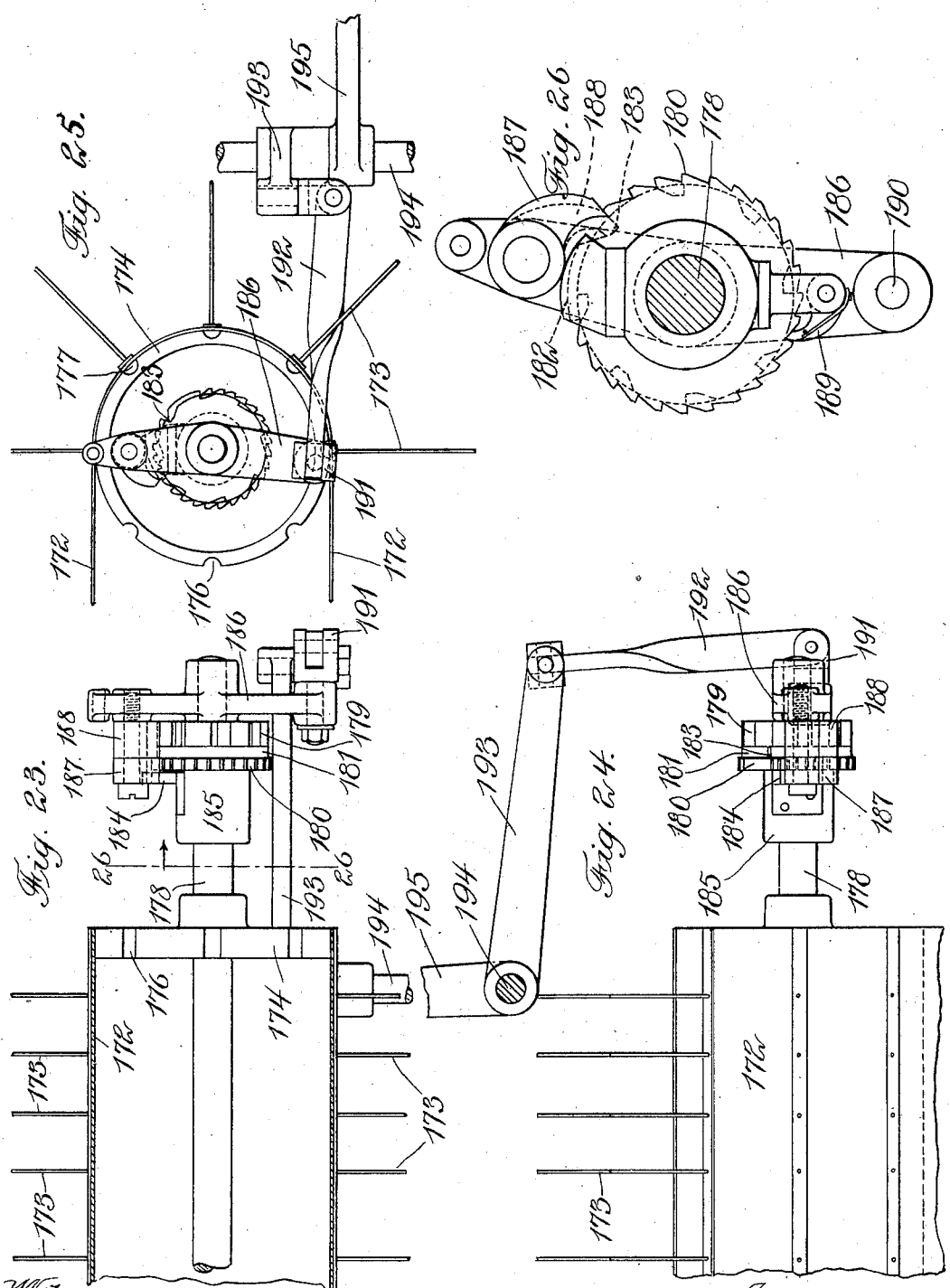

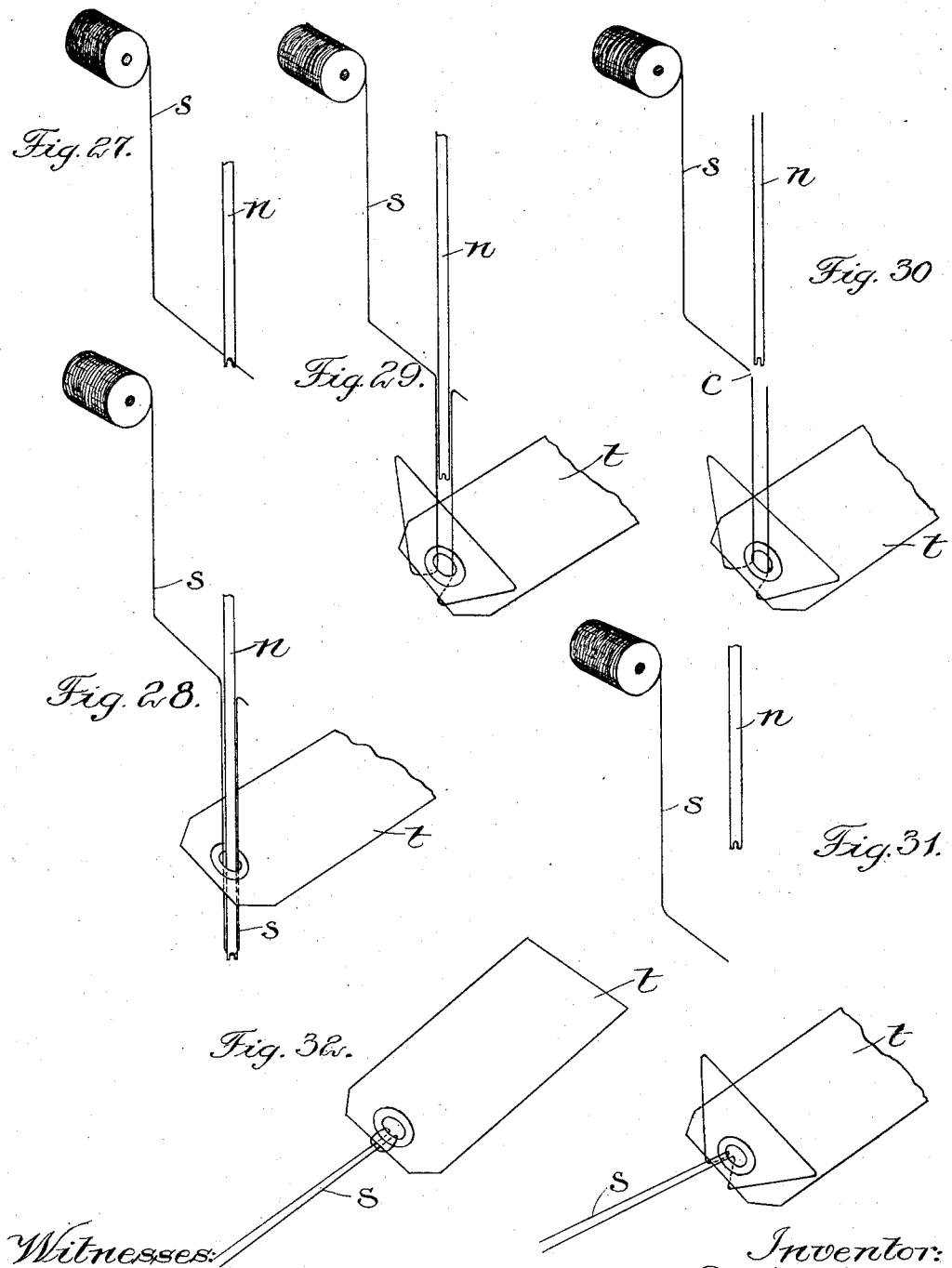

No. 738,253. Patented September 8, 1903.

UNITED STATES PATENT OFFICE.

FREDERICK A. SUCK, OF BOSTON, MASSACHUSETTS.

TAG-STRINGING MACHINE.

SPECIFICATION forming part of Letters Patent No. 738,253, dated September 8, 1903.

Application filed November 24, 1902. Serial No. 132,577. (No model.)

*To all whom it may concern:*

Be it known that I, FREDERICK A. SUCK, of Boston, in the county of Suffolk and State of Massachusetts, have invented certain new and useful Improvements in Tag-Stringing Machines, of which the following is a specification.

This invention relates to machines for automatically supplying doubled strings to tags and for securing them thereto with two free loose ends for tying purposes.

The invention has particular reference to that type of machines which supply the doubled strings to tags which have been previously perforated and preferably reinforced around the perforations.

The object of my invention is to provide a rapidly-operating automatic machine which will take the cord or string from a ball or spool, double it and pass it through the perforation of the tag, then cut off the section of string, and then complete the particular tag by passing the two ends of the string through the loop which has been inserted through the perforation and then drawing the loop taut.

Another object of the invention is to provide a machine of this character which may be readily adapted to accommodate any length or width of tag that may be desired within reasonable limits and to vary the amount of string cut off, so as to vary the length of the loose ends as may be desired.

Another object of the invention is to provide a machine of this character in which all of the motions of the various parts, with the exception of the drawing device, will be obtained from cams upon a single power or hand driven wheel.

Further objects of the invention are to simplify the general construction and operation of the machine, to cheapen the cost thereof, and to facilitate the operation.

Figure 2:
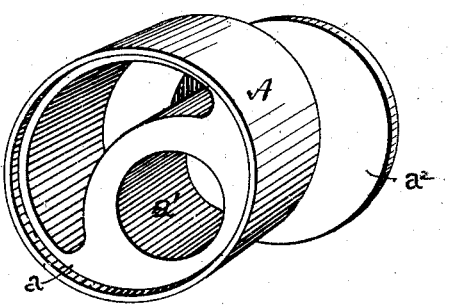
Figure 3:
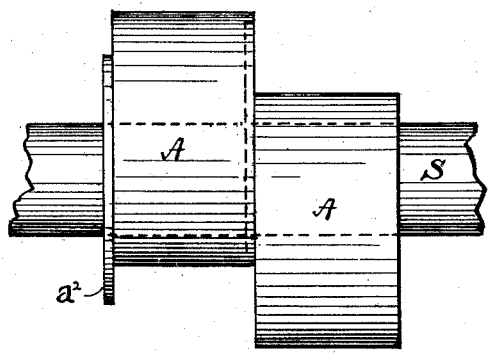
Figure 4:
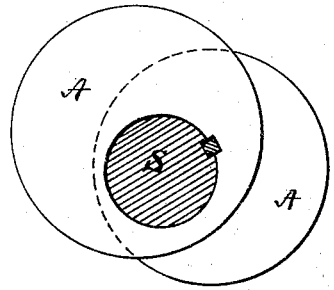
Figure 5:
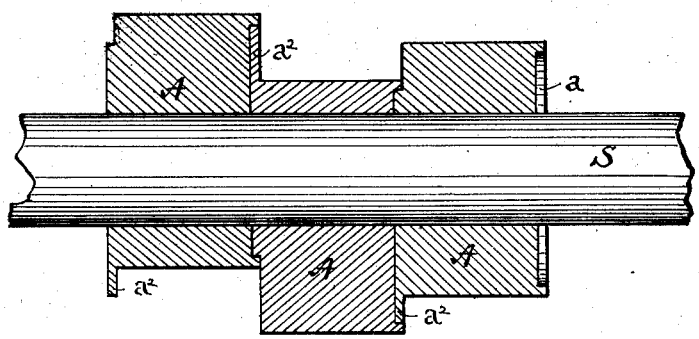

Of the accompanying drawings, Figure 1 is a front elevation of a machine embodying my present invention. Fig. 2 represents an end view of the same looking from the left of Fig. 1. Fig. 3 represents an enlarged detail of the upper portion of Fig. 2. Fig. 4 represents a section on the line 4 4 of Fig. 3. Fig. 5 represents a detail elevation of the head of the machine, which carries the gripping-jaws, shears, and coöperating parts, said figure representing a view in the same direction as in Fig. 2. Fig. 6 represents a detail front elevation looking from the right of Fig. 5. Fig. 7 represents a plan view of the parts shown in Fig. 5. Fig. 8 represents a detail section on the line 8 8 of Fig. 5. Fig. 9 represents a detail section on the line 9 9 of Fig. 5. Fig. 10 represents a detail section on the line 10 10 of Fig. 7. Fig. 11 represents a detail elevation of the string-gripper for preventing the upstroke of the needle and take-up from displacing the string. Fig. 12 represents a side elevation of the gripper looking from the right of Fig. 11. Fig. 13 represents a detail elevation of the spreaders, their cam-guides, and adjacent parts. Fig. 14 represents a section on the line 14 14 of Fig. 13. Fig. 15 represents a perspective view of the spreaders and the lower portion of the needle. Fig. 16 represents an elevation of the lower portion of the needle. Fig. 17 represents a section on the line 17 17 of Fig. 16. Fig. 18 represents a detail elevation of the table and parts immediately above and below the same, this figure representing a view in the same direction as Fig. 1. Fig. 19 represents a plan view of the parts shown in Fig. 18. Fig. 20 represents a plan view of the delivery-jaws and slides therefor. Fig. 21 represents a plan view of a portion of the table and the devices for holding the tags in position for applying the string, the delivery-jaws and the tag-feed being represented by dotted lines. Fig. 22 represents a detail view of some of the parts represented in Fig. 19, enlarged and looking from below. Fig. 23 represents a detail elevation of part of the mechanism for operating the conveyer-belt, the latter being shown in section. Fig. 24 represents a plan view of the parts shown in Fig. 23. Fig. 25 represents an elevation looking from the right of Fig. 23. Fig. 26 represents an enlarged detail elevation of some of the parts shown in Fig. 23 looking in the direction of the arrow 26. Figs. 27 to 32, inclusive, represent steps of applying and fastening the string to the tag.

The same reference characters indicate the same or similar parts throughout all the views.

Referring first to Figs. 27 to 32, inclusive, the work performed by the machine will be described. The string (indicated at *s*) is taken from a spool or reel or other suitable source of supply and is engaged by the notched end of the string-inserter or needle n, as shown in Fig. 27, and the loop of string is carried downward by the needle and is inserted through the usual reinforced opening or eye in the tag t, as shown in Fig. 28, after which the portions of the strings along the sides of the needle below the tag are taken by spreaders, hereinafter described, and carried up to the position represented in Fig. 29. At the same time the needle rises, and after the needle has ascended to the position represented in Fig. 30 the string is cut at the point c. The two ends of the string are then grasped by the gripping-jaws and pulled through the spread loop, as shown in Fig. 31, and the continued motion to the gripping-jaws first pulls the loop taut, as shown in Fig. 32, and continuing to pull on the ends of the string pulls the strung tag from the position in which the tag has been held. This completes the operation of the work of stringing the tag; but, as hereinafter described, the last-mentioned movement of the gripping-jaws deposits the strung tag on the delivery conveyer-belt. A suitable base or standard is represented at 40. (See particularly Figs. 1 and 2.) Said standard supports a power or hand operated shaft 41, said shaft being shown as provided with fast and loose pulleys. One end of the shaft is mounted in the bearing carried by a bracket 42. Secured to the other end of the shaft 41 is a crank-wheel 43, having a crank-pin connected by a pitman 44 with a lever 45, pivoted, as at 46, to the base of the standard and having its upper end connected to the gripper-slide, which, as hereinafter described, pulls the ends of the string through the loop and draws the string of the tag taut and delivers the tag to the conveyer-belt. To the shaft 41 is secured a bevel-gear 47, which meshes with a similar gear 48, secured to the lower end of the vertical shaft 49. Said vertical shaft carries all of the cams which actuate all of the parts of the mechanism with the exception of the gripper-slide. Each cam is designed, as hereinafter appears, to completely actuate its mechanism during one rotation of the shaft. The gears 47 and 48 have the same number of teeth, and therefore each cam operation coincides with the operation of the gripper. In other words, a single rotation of shaft 41 completes the cycle of operation of the different mechanisms, the relative timing of the operation of the different mechanisms being that hereinbefore described in connection with Figs. 27 to 32, inclusive. The table of the machine is represented at 50, said table being supported by the arms 51 52 of a bracket 53, suitably secured to the standard 40. Mounted on the table 50 is a tag-hopper 54, said hopper having a vertical portion and a horizontal portion connected by a curved portion. Mounted to slide in said hopper is a tag-pressure block 55, having a finger 56 projecting through a longitudinal slot in the lower side of the hopper. Located adjacent to the vertical portion of the hopper is a pulley 57, over which a flexible connection 58 passes. Said flexible connection 58 is secured at one end to the finger 56 and at its other end is connected to a weight 59. The direction of pull exerted by the weight 59 through the connection 58 is such as to cause the block 55 to exert pressure on the outermost one of a series of tags placed in the hopper. In order that the weight 59 may have a path of movement free from the standard or parts of the machine, I may lead the flexible connection 58 over an idler-pulley, as at 60. The tags commonly used have reinforced or thickened portions around their string-holes. These thickened portions render it impossible to arrange a series of tags with their holes in alinement so that they will all lie in the same plane. The curved section of the hopper enables me to arrange the tags so that the block 55 will exert equal pressure on those tags which are at the bottom of the hopper, thus insuring proper feeding of the tags by engaging a feed device with the reinforced portion or collar of the tag, as will be hereinafter described. To secure this advantage, the tags will be arranged in the hopper with their reinforced ends uppermost, so that their unreinforced or thin edges will be pushed along the bottom of the horizontal portion of the hopper, the curved portion of said hopper compensating for the increased thickness of a series along the reinforced portion thereof as compared with the unreinforced portions.

Referring to Figs. 21 and 22, it will be seen that the table 50 is formed with a slot 61. The upper surface of the table is provided with a recess $61^X$, forming ways for the feed-slide 62, which is secured by screws 63 to a plate 64 under the table, as shown in Fig. 22. The upper surface of the feed-slide is flush with the upper surface of the table. In order that the position of the slide 62 relatively to the plate 64 may be adjusted to adapt the slide to engage the thickened portions of tags which vary in the positions of their reinforced sections or collars, the screws 63 pass through elongated slots $63^X$ in the plate 64. The under side of the plate 64 is provided with a pin 65, which passes through an elongated slot in an arm 66, pivoted at 67 to the under side of the table and connected by a link 68 with a lever 69. Said lever 69 is pivoted to a lug 70, projecting from the standard 40, and the other end of said lever is provided with a pin or roll 71, engaged and operated by a cam-groove 72, formed in a disk 73, carried by the vertical shaft 49. (See Figs. 1 and 2.) The forward end of the slide 62 is reduced in thickness so as to form a shoulder 74. (See Figs. 14 and 21.) This recess permits the collar or reinforce of the bottom tag of the series to drop in front of the shoulder 74, while the body of the tag rests on the table and on the slide recessed therein, so that as the slide is advanced the said shoulder 74 will engage the collar or reinforce of the lower tag of the series and push against it and carry the tag forward to the position for the needle to insert the loop of string through the hole of the tag. The forward end of the slide is fork-shaped, so that the sides of the fork will support the collar of the tag against the downward pressure caused by the act of inserting the string and also to prevent the weight or pressure caused by the series of tags and by the pressure-block in the hopper from excessively depressing the collar of the bottom tag, which is about to be engaged by the slide. The amount of reciprocation given to the feed-slide will be such as to just take the bottom tag that is resting on the table and push it forward to the exact location, so that the hole in the tag will be directly beneath the string-inserting needle. The lower tag is not pushed entirely from beneath the series in the hopper, and therefore the pressure caused by the remainder of the tag and by the pressure-block in the hopper will aid in holding the tag in position for the further operations to be described. To prevent the tag which rests upon the bottom one from being partially ejected by the frictional engagement of the one thus being fed, I provide suitable detent mechanism.

In Figs. 13 and 14 a wall or upright 75 is shown as mounted upon the table. Said wall may be a portion of the wall of the hopper. It is cut away at the bottom, as at 76, and forms a passage for the tag. Adjustably secured in the wall 75 are two slides or stops 77, which are adapted to have their lower ends projected more or less across the passage 76. Each of said stops 77 is formed with a stem 78, extending up through the wall 75 and screw-threaded at its upper end. A nut 79 is fitted to the threaded end of the stem 78, while a plate 80 is secured to the upper edge of the wall and extends over the nut. I may employ a spring 81, surrounding the lower end of the stem 78 and bearing upon the stop 77, to hold said stop in its lowermost position permitted by the adjustment of the nut 79. The plate 80 prevents the stop 77 from being lifted. By means of the two nuts 79 the two stops 77 may be adjusted according to the thickness of tags that are being strung, so as to permit the feed of but one tag at a time.

I will now describe the means for inserting a doubled portion of string through the hole of the tag which has been fed. The upper portion of the standard 40 above the table 50 supports a head 82, which is adjustable vertically on the standard 40, as will be hereinafter described. Mounted to reciprocate in vertical bearings formed in the outer end of head 82 and in a lateral arm 83 at the upper end of the standard is a string-inserter comprising a rod 84, the lower end of which I term a "needle." (See Figs. 1, 2, 3, 16, 17, and 27 to 31.) The lower end of the needle is notched, as at 85, (see Figs. 16 and 17,) and the sides of the lower portion of the needle are preferably grooved, as at 86, to receive the string. The upper end of the needle is adjustably secured in a cross-head 87, said cross-head being connected by links 88 (see Figs. 1, 2, and 3) with the end of a lever 89, pivoted to the standard, as at 90. In order to vary the amount of reciprocations of the needle, so as to increase or diminish the length of string that will be passed through the tag, lever 89 has a variable fulcrum. This may consist, as shown in Fig. 3, by forming the lever with several holes, through which the pivot-pin 90 may be passed, and by forming the supporting-standard with a plurality of holes, in either one of which said pin may be mounted. A link 91 connects the lever 89 with a slide 92, mounted in vertical ways carried by the upper portion of the standard 40. A pin 93, projecting from said slide, engages a groove in a cylinder-cam 94, mounted on the upper end of shaft 49. (See Figs. 3 and 4.) The needle has suitable movement or throw imparted to it, and when in its uppermost position the cross-head 87 is at such a height above the upper needle guide or bearing that vibrations would be liable to interfere with the rapid operations of the machine. To prevent the occurrence of such vibrations, the cross-head 87 is formed with an aperture fitting a vertical guide-rod 95, rising from the arm 83 of the standard. The string is led from a suitable source of supply, as a reel 96, which may be supported by the upper end of the standard or otherwise, as may be preferred. From the reel the string passes through the guide-eye 97, mounted on the standard, as shown in Fig. 1, then up and over a pulley 98, carried at the end of lever 89, (see Fig. 2,) and then down through a guide-passage 99, formed in the outer end of the head 82, (see Fig. 10,) and into position for being acted upon by the parts below the outer end of said head, which parts will be presently described. Above the upper end of the guide-passage 99 is a string-clamp. (See Figs. 5, 10, 11, and 12.) Said clamp, as illustrated, consists of a pair of jaws 100, pivoted to a bracket 101, secured to the top of the outer end of the head 82. The two jaws are pressed normally toward each other by springs 102. One of said jaws may be rigid and comprise a fixed abutment, against which the other jaw is pressed by a spring. The opposing faces of the jaws are so formed as to clamp the string that passes between them on its way to the passage 99 in such manner that the upward movement of the take-up pulley 98 cannot exert a pull upon that portion of the string below the clamp, thus leaving all portions of the string below the head free to be acted upon, as hereinafter described.

Below the lower end of the string-passage 99 is a block 103 having a tapered guide-eye.

This block will be so secured in place that the eye therein will deflect the string slightly forward or backward, as may be found desirable in setting up the machine. Said block is in a dovetailed groove, as shown in Figs. 6 and 10, and is held in the desired position by means such as a screw 104.

Next below the block 103 is a plate 105, mounted to slide in suitable ways therefor formed in the head 82. The inner end of said slide 105 is provided with a pin 106, to which is connected the end of a slide-bar 107, mounted in suitable horizontal ways in the sides of the head 82. The said slide-bar 107 is formed with an arm or lateral offset 108, (indicated by dotted lines in Fig. 7.) The end of arm 108 carries a pin or roller 109, entering a cam-groove in a disk 110, (see Fig. 5,) secured to a sleeve 111, which has a feathered or spline connection with the shaft 49. The sleeve 111 also carries two other cams, which will be presently referred to, this provision of a single sleeve common to a plurality of cam-disks, which sleeve has a splined connection, being for the purpose of retaining the connection between the shaft 49 and the plurality of cams when the head 82 is vertically adjusted on the standard. The sleeve and the three cams shown are located between bearings 112, carried by the head 82.

Pivotally connected to the slide-plate 105, on the under side thereof, are two nippers 113, designed to take hold of the string which passes down at one side of the needle-aperture and carry it across to the other side of the path of the needle and hold the string so that the notched lower end of the needle will take the string, double it, and push it down through the hole of the tag. The nippers are represented by dotted lines in Figs. 7 and 8, their pivots being indicated at 114. The outer ends of said nippers are pivotally connected by links 115 (see Fig. 10) with a widened head of a slide-bearing 116, which is actuated by a cam-groove in a disk 117 in the same manner that the slide-plate 105 is actuated by the cam-disk 110. In Fig. 8 the nippers are shown as open and as having released the string. The relative timing of the operation of the cam-disks 110 and 117 is such that the slide-plate 105 will be moved toward the left from the position indicated in Fig. 8, while the nippers remain open. When the nippers have taken positions on opposite sides of the string (indicated at s in Fig. 8,) the cam 117 first acts to push the bearing 116 outwardly and through the links 115 to close the nippers on the string. The moment that this has occurred the cam in the disk 110 begins to act to return the slide-plate 105 to the position shown in the drawings, the cam of the disk 117 continuing to so act as to keep the nippers closed on the string. The cam of the disk 117 first acts to open the nippers to the position shown in Fig. 8, and then the nippers and slide-plate 105 move to the left again together, ready to repeat the operation.

The timing of the operation of the parts is such that after the nippers have carried the string outward below the needle they remain so as to hold the end of the string firmly while the needle descends, the notched end of the needle taking the string, as represented in Fig. 27. The nippers continue to hold the end of the string while the needle is forming the loop and carrying it completely down through the tag to the point substantially as shown in Fig. 28. When the spreaders begin to act, the nippers still hold the end of the string.

Referring to Figs. 13, 14, and 22, a rock-shaft 118 is mounted in fixed bearings 119, secured to the under side of the table 50. The intermediate portion of shaft 118 is formed as a box, extending across which are two pivot-pins 120, said pivot-pins passing through apertures 121, (see Fig. 15,) formed in the flattened ends of the spreader-arms 122. The flattened portions of the spreaders fit closely between the sides of the box-like portion of the rock-shaft, so that said arms will be rocked with the shaft. The pivotal connection of the spreaders with said rock-shaft by means of the pivot-pins 120 permits said spreaders as they rock to follow the paths of movement prescribed for them by the stationary slotted guides 123, which are secured to the under side of the table. The spreaders themselves extend between the two guides 123, said spreaders carrying lateral offset rolls, which enter the slots of the guides. These guides 123 are so shaped that when the spreaders are in their lowermost position, as shown by full lines in Fig. 14, their points will be very near together. The rock-shaft 118 is provided with a pinion 124, meshing with a rack 125, carried by a slide-bar 126, mounted to reciprocate in guides 127, secured to the under side of the table. (See Fig. 22.) A pin 128 projects from a plate 129, which is adjustably secured to the under side of the bar 126 by screws or bolts 130 passing through slots in the plate 129. The pin 128 enters a slot in one end of a lever 131, pivotally mounted at 132 on a bracket or arm projecting from the standard 40. The other end of the lever 131 carries a pin or roll 133, which enters a cam-groove formed in the upper face of a disk 134, secured to the shaft 49. (See Figs. 1, 2, and 18.)

It will be now understood that the reciprocations of the bar 126 will cause the spreaders to move between the positions shown by full and dotted lines in Fig. 14 and that, owing to the locations of the slotted guides 123, the said spreaders will be at an angle of wide divergence when they have been moved to the position indicated by dotted lines in Fig. 14.

It is to be understood that when the spreaders are in the positions shown by full lines in Fig. 14 the string will be carried to the position shown in Fig. 28. The advance of the spreaders will cause their tips to enter between the sides of the needle and the stretches at the sides thereof, as shown in Fig. 15, the sides of the needle being cut away, as shown in Figs. 15 and 17.

Secured to the outer side of each spreader 122 is a forwardly-projecting spring-finger 135. (See Fig. 15.) The outer free ends of the fingers 135 are slightly bent outwardly, so as to facilitate the entrance of the string into the space between each finger 135 and its respective spreader-arm. These spring-fingers cause the string to be retained in engagement with the forward ends of the spreaders during the movement of the latter from their lower to their upper position, so as to open out the loop to substantially the position shown in Fig. 29. During the last-mentioned movements of the spreaders the needle is simultaneously rising to give up the slack to form the loop. To insure the passage of the string fully under the fingers 135, I provide a retainer-finger or projection 136, shown in Fig. 14 as rising from an arm 137, carried by a stud 138, rising from the bracket 53. (See Figs. 2, 13, 14, and 18.) This arm 137 is formed with an aperture 139 to receive the lower end of the needle when the latter is in its lowermost position, so that the advancing movements of the spreaders 122 to engage the string will not deflect the needle.

After the string has been brought to the position shown in Fig. 29 it is cut at the point indicated at c in Fig. 30. To perform this operation, I provide shears 140. (See Figs. 5, 6, 7, 9, and 10.) The shears are pivoted at 141 to a fixed plate 142, secured to the head 82. The ends of the arms of the shears are connected by links 143 to a pin 144, carried by a slide-bar 145, which is below the bars 107 and 116 and is actuated by a cam-groove in the lower face of the disk 146. The three cam-disks 110, 117, and 146 are all carried by the sleeve 111, before referred to. The timing of the operation of the cam-disk 146 is such as to exert a pull on the bar 145 and on the links 143 so as to cause the shears 140 to sever the string at the point c in Fig. 30 and so as to leave an end of the string above the cut ready to be grasped by the nippers 113 for the next operation.

I will now describe the operation of the grippers for seizing the ends of the string and drawing the loop taut and pulling out the tag and depositing it on the conveyer. As has been stated, the lever 45 (see Figs. 1 and 18) actuates the gripper-slide. The upper end of the lever 45 is connected by a link 147 (see Figs. 19 and 20) with the gripper-carriage. Said carriage comprises a slide 148, adapted to be reciprocated along the slot 149, formed in an upright wall 150 of the table 50. (See Figs. 1, 13, 14, and 18.) The link 145 is connected to said slide, as by a bolt 151. The slide 148 has a forwardly-projecting arm 152, (see Figs. 18, 19, and 20,) carrying a cam 153 at its end. The purpose of this cam will be explained hereinafter. The gripping-jaws 154 are pivoted at 155 to a portion of the slide 148 which projects over the table 50. The rear arms of the grippers are connected by links 156 with a lever 157, pivoted at 158 to the slide 148, the said links being pivoted to said lever at opposite sides of the latter. A spring 159, secured at one end to the slide and at the other end to the rearwardly-projecting arm of one of the grippers, normally acts to hold the grippers in closed position, as shown by full lines in Fig. 20. The lever 157 has a pin or roll 160 at its end, which during the reciprocations of the gripper-carriage engages a switch-cam, so as to open the grippers at each end of the reciprocation, as will now be described. Secured to the upper edge of the wall 150 are two plates 161, each having a switch-cam 162 on the under side of the plate and pivoted thereto, as at 163. (See Figs. 18, 19, 20, and 21.) The construction of the two switch-cams and plates is substantially the same, excepting that the cams face in opposite directions. Each cam is normally held in the position shown by dotted lines in Fig. 20 by a spring 164. It will be apparent from Fig. 20 that as the gripper-carriage reciprocates between the two positions represented by full and dotted lines in Fig. 20 the grippers 154 will be opened whenever the roll 160 travels along the outer edge of a switch-cam and that after the carriage moves to the extreme at either end of its reciprocation the spring 159 causes the grippers to close and throws the roll 160 over to a position close to the wall 150. As the carriage returns, then the roll 160 passes behind the switch-cam, so that the returning movement keeps the grippers closed. The switch-cam at the right in Fig. 20 holds the grippers open during a short portion of the advance toward the tag which has been strung, as hereinbefore described, and then permits the grippers to close on the two ends of the string. (Shown in Fig. 30.) Then as the grippers recede they pull the ends of the string and draw the loop down to the position shown in Fig. 32, the tag being meanwhile retained during the drawing up of the loop by devices which will be presently described. When the grippers have nearly reached the position shown by full lines in Fig. 20, the roll 160 passes over the switch-cam at the outer end of the table, at the left in Fig. 20, and causes the grippers to open and release the tag, permitting the said tag to drop through an opening in the table (see Figs. 19 and 20) onto the conveyer, which will be presently described. The devices which hold or retain the tag during that portion of the travel of the grippers which changes the position of the string from that shown in Fig. 30 to that shown in Fig. 32 will now be described.

Referring to Figs. 1, 13, 14, 18, 19, and 21, a rock-shaft 165 is mounted in bearings 166 at the lower edge of the upright 75. Said rock-shaft has an arm 167, provided with a pin 168 at its end, said pin being adapted to be engaged so as to elevate the arm by the cam 153, hereinbefore mentioned as carried by the gripper-carriage slide. Secured to the rock-shaft 165 are two arms 169, having disks 170 adjustably secured therein. A spring 171, which may be coiled about the shaft 165, serves to normally hold the retaining-disks or tag-stops 170 on the table so that said disks will be engaged by the forward edge of the tag when the latter has stopped in position with its hole under the needle. The location of the cam 153 is such that it causes the retaining-disks to rise and release the tag just at the moment the grippers have brought the string to the position shown in Fig. 32. The retaining-disks rise also when the cam 153 is moving to the right, (shown in Fig. 20;) but at this time there is no pull being exerted on the tag, and therefore after the cam passes the retainers drop again to the position in front of the edge of the tag and hold it until the outward movement of the gripper-carriage pulls the string and the cam 153 causes the retainers to rise.

I will now describe the means for gathering the string-tags in lots or bunches of a predetermined number, such as twenty-five, and conveying them to a position within convenient reach of an attendant.

Referring to Figs. 1, 2, 18, 19, 23, 24, 25, and 26, the conveyer comprises an endless belt 172, having a series of dividing-partitions 173, which may comprise rolls or pins. Said belt is supported upon drums 174, suitably mounted on a portion of the frame and upon a standard 175. The drums are preferably provided with longitudinal grooves 176, which receive ribs 177, running across one side of the belt, so that the positive actuation of the drums in this case will positively move the conveyer-belt and its partitions. The shaft of one of the drums is extended, as at 178, and secured to said shaft is a ratchet 179. Loose upon the shaft and adjacent to the ratchet 179 is a compound ratchet consisting of two members 180 and 181. The member 180 is provided with a number of teeth, as twenty-four in this instance, covering about seven-eighths of its periphery. The remaining one-eighth of the periphery is not toothed or notched, as indicated at 182 in Fig. 26. The member 181 has but a single notch, as at 183. (See Fig. 23.) Adjacent to the outer side of the member 180 is a shield 184, which is held in fixed position, as by being mounted on a bracket-bearing 185 for the shaft 178. The ratchet 179, which is fast on the shaft 178, is shown as having eight notches or teeth. Loosely mounted on the outer end of the shaft 178 is an oscillating bar 186, carrying two pawls 187 188. The pawl 187 rides during a portion of its movement on the top of the shield 184; but when it passes off from the end of the shield it moves the compound ratchet 180 181 the distance of the tooth of the member 180. The pawl 188 rides upon the periphery of the member 181 until rotation of the compound members 180 181 has brought the notch 183 of the member 181 into position under the pawl 188. The next oscillation of the bar 186 then causes the pawl 188 to actuate the ratchet 179 and turn the shaft 178 so as to advance the conveyer-belt a distance equal to the space between two of its partitions. A suitable detent-pawl 189 (see Fig. 26) engages the ratchet member 180 to prevent return movement. The bar 186 is oscillated by the following means: Secured to its lower end 190 is a knuckle-joint member 191, to which is pivoted a link 192, said link being connected to an arm 193 of a rock-shaft 194. Said rock-shaft has another arm 195, said arm having a pin or roll at its outer end engaging an eccentric cam-groove in a disk 196, secured to the shaft 49. (See Fig. 2.) The conveyer when stationary presents a partition substantially as shown in Fig. 2. As the tags are released by the grippers they drop through the opening in the table on the inclined partition 173, that is beneath said opening. They fall edgewise and stack themselves in the wide space between the two partitions. The timing of the operation of the conveyer is such that when a predetermined number of strung tags have dropped into a space of the conveyer, as just described, (said predetermined number being twenty-five in this instance,) the conveyer will be actuated so that the partition which has been inclined to receive the tags will be closed upon the series of tags and carry them out within reach of the attendant in an obvious manner.

It will now be understood that in the particular embodiment of the invention illustrated in the drawings the conveyer or belt has partitions for receiving between them the strung tags and carrying them away from the machine in groups or packages. It will be also understood that in this embodiment of the invention some of the partitions are held spread apart to receive the strung tags by the means comprising the inner drum 174, over the periphery of which a portion of the belt is curved, the holding of the belt or conveyer stationary holding spread apart those partitions which project from that portion of the belt which is in contact with said drum, and the means for actuating the conveyer to advance the partitions and to close them upon the package of tags comprises the mechanism hereinbefore described for actuating the conveyer through the medium of one of the drums. In other words, the actuating means are those elements of the mechanism which act upon one of the drums to positively rotate it. The attachment of the partitions to the belt produces the result of closing the partitions upon the tags after they leave the curved portion of the inner drum and proceed in a horizontal plane.

The various parts are adjustable, as has been described, to adapt the machine for varying sizes of tags. When the length of the string is to be varied, the head 82 is adjusted vertically on the standard. As shown in Figs. 2, 5, 6, and 7, the standard is provided with ways 197, the back 198 of the head being formed with a vertical dovetailed recess to receive the ways 197. A screw or screws 199, tapped through one side of the head, serve to clamp the head in adjustable position, said screw bearing against a gib 200. (See Fig. 7.)

Having described the general operation of the machine at the outset and the functions of the several details, further description of the operations of the machine or parts thereof will be unnecessary. It is to be understood that I do not limit myself to the precise mechanisms or details shown nor to the exact relative arrangements or positions thereof. For instance, it is not abolutely essential that the tags should be fed horizontally and the needle vertically, and therefore it is to be understood that in the appended claims such phraseology as refers to carrying the loop above the tag is used only to describe a relative position of the loop. If the tag should be held vertically and the needle operate horizontally, the loop would be carried by the spreaders over the edge of the tag, but not necessarily above it. Such an arrangement is intended by me to be within the scope of the appended claims.

I claim—

1. A machine of the character described, comprising means for inserting a loop of string through the eye of a tag, means for carrying the loop over the edge of the tag, string-cutting devices, and means for pulling the ends of the string through the loop and tightening the latter.

2. A machine of the character described, comprising means for inserting a loop of string through the eye of a tag, means for carrying the loop over the edge of the tag, string-cutting devices, and means for pulling the ends of the string through the loop and tightening the latter and drawing the tag from the position occupied by it during the stringing operation.

3. A machine of the character described, comprising means for inserting a loop of string through the eye of a tag, means for carrying the loop over the edge of the tag and spreading said loop, a string-cutter, and means for passing the ends of the string through the spread loop and for pulling the loop taut and removing the string-tag.

4. A machine of the character described, comprising a tag-hopper, means for feeding the tags therefrom one by one, a string-inserter movable through the eye of an ejected tag, a string-guide at one side of the path of movement of said inserter, means for carrying one end of a length of string from said guide across the path of movement of said inserter and for holding it while the inserter pushes a loop of the string through the tag-eye, means for severing the string, and means for passing the two ends of the string through the loop and then tightening the latter.

5. A machine of the character described, comprising a tag-hopper, means for feeding the tags therefrom one by one, a string-inserter movable through the eye of an ejected tag, a string-guide at one side of the path of movement of said inserter, means for carrying one end of a length of string from said guide across the path of movement of the inserter and for holding it while the inserter pushes a loop of the string through the tag-eye, means for severing the string, means for carrying the inserted loop over the edge of the tag and spreading it, and means for passing the two ends of the string through the loop and then tightening the latter.

6. A machine of the character described, comprising a tag-hopper, means for partly ejecting the bottom tag whereby the remainder of the tags will bear on a portion of the partly-ejected tag, and means for securing a string to the projected portion of the tag.

7. A machine of the character described, comprising a tag-hopper, means for partly ejecting the bottom tag and leaving the remainder of the tags bearing on a portion of the partly-ejected tag, stops for limiting the outward movement of the tag, means for inserting a loop of string through the tag, means for moving said stops out of the path of movement of the tag, and means for completing the connection of the string with the tag and removing the latter.

8. A machine of the character described, comprising means for inserting a loop of string through the eye of a tag, means for carrying the loop over the edge of the tag, string-cutting devices, means for pulling the ends of the string through the loop and tightening the latter, and a conveyer for receiving the tags after the strings have been connected thereto.

9. A machine of the character described, comprising means for inserting a loop of string through the eye of a tag, means for carrying the loop over the edge of the tag, string-cutting devices, means for pulling the ends of the string through the loop and tightening the latter, a conveyer having partitions for receiving the strung tags, and means for intermittently operating the conveyer to cause it to receive a predetermined number of tags between the partitions and remove that number.

10. A machine of the character described, comprising a table formed with a recess, a tag-hopper, a feed-slide having a shoulder and mounted to reciprocate in said recess, the upper surface of the slide being flush with the upper surface of the table, a lever having a link connecting it with said slide, a driving-shaft having a crank-wheel, a pitman connecting the crank-wheel and lever, and means for securing the strings to the tags as they are fed by said slide.

11. In a machine of the character described, a power-shaft, a cam-shaft at an angle thereto and having gear connections therewith, cams on the last-mentioned shaft, a tag-hopper, a feed-slide, a lever connected with the feed-slide and having operative connections with the power-shaft, and means controlled by the cams on the cam-shaft for connecting sections of string with the tags fed from the hopper.

12. In a machine of the character described, a tag-hopper comprising two portions at an angle to each other and connected by a curved portion, means for exerting pressure on the tags in the hopper, and means for feeding the tags from said hopper and applying strings thereto.

13. In a machine of the character described, a feed-hopper comprising horizontal and vertical portions and an intermediate curved portion, means for exerting pressure against the outermost tag in the horizontal portion, means for feeding tags from the lower end of the vertical portion of the hopper, and means for applying strings to the tags fed from said hopper.

14. In a machine of the character described, a table having a recessed guideway and a slot, a tag-hopper above the slotted portion of the table, a feed-slide having its upper surface flush with the upper surface of the table and having its front end cut away to form a shoulder and movable in said guideway, means for actuating the slide and means for applying strings to the tags fed by said slide.

15. In a machine of the character described, a table having a slot, a tag-hopper above the slotted portion of the table, a feed-slide having its front end cut away to form a shoulder and fork-shaped in front of said shoulder, means extending through said slot for actuating the slide, and means for applying strings to the tags fed by said slide.

16. In a machine of the character described, a reciprocating string-inserter, a table, means for feeding a tag and holding it in position on said table under the inserter, string-carrying jaws for grasping one end of a piece of string and carrying it across the path of movement of the inserter in a plane above that of the table, a cutter for the string, and means whereby the loop of string carried through the tag by the inserter will be tied to the tag.

17. In a machine of the character described, a table, means for feeding tags thereon, a reciprocating string-inserter mounted in guides above the table, a guide-rod parallel with the upper portion of the inserter, connections between said guide-rod and the inserter for preventing vibrations of the latter, and means for reciprocating the inserter.

18. In a machine of the character described, a table, means for feeding tags thereon, a reciprocating string-inserter mounted in guides above the table, a guide-rod parallel with the upper portion of the inserter, connections between said guide-rod and the inserter for preventing vibrations of the latter, and means for reciprocating the inserter, said means comprising a lever having an adjustable fulcrum, a link connecting the lever with the inserter, a cam, and connections whereby the cam may actuate the lever.

19. In a machine of the character described, a table, a head above the table and having a string-guide, a string-inserter movable through said head adjacent to the said guide, means for carrying string across the path of movement of the inserter, a take-up for the string movable with the inserter, string-severing means, a tag-hopper, means for feeding tags therefrom one at a time under the string-inserter, and means for tying string to each tag after the string has been pushed through the tag by the inserter.

20. In a machine of the character described, a table, means for feeding and holding a tag thereon, a string-inserter movable through the tag, a plate mounted to slide in suitable ways above the table, means for reciprocating said plate, a string-guide at one side of the path of movement of the inserter, nippers movably connected with said slide, means whereby said nippers will close on the string below the string-guide and carry the string under the inserter, and means for opening the nippers and holding them separated during the return of the slide.

21. In a machine of the character described, the combination with the head 82 having string-guide 99, of a thread-inserter movable through the head at one side of the guide 99, the slide-plate 105, the nippers 113 pivotally connected to the slide-plate, a second slide having links connecting it with the nippers, and means for moving the two slides together in one direction for giving the link-operating slide an initial return movement and then returning both slides together.

22. In a machine of the character described, the combination with tag-feeding means and an inserter for carrying a doubled string through the tag, of a pair of spreading-arms for engaging the string each side of the inserter below the tag, means for moving said arms in diverging paths to carry the loop around the edge of the tag, and means for passing the ends of the strings through the loop and tightening the latter.

23. In a machine of the character described, the combination with tag-feeding means and an inserter for carrying a doubled string through the tag, of a rock-shaft, a pair of spreader-arms connected therewith, the connections being such as to permit the arms to swing apart from each other while following the motion of the shaft, guides for directing the paths of movement of the arms, and means for passing the ends of the string through the loop spread by said arms and tightening the loop.

24. In a machine of the character described, the combination with tag-feeding means and an inserter for carrying a doubled string through the tag, of a rock-shaft having a hollow portion, pins 120 carried thereby, spreader-arms 122 pivoted on said pins, stationary guides 123 for the arms, and means for passing the ends of the string through the loop spread by said arms and tightening the loop.

25. In a machine of the character described, the combination with tag-feeding means and an inserter for carrying a doubled string through the tag, of means for carrying one end of a length of string across the path of movement of the inserter, shears located at one side of the path of movement of the inserter below the said string-end carrier, means for actuating said shears to sever the string after a loop has been carried by the inserter through the tag, and means for passing the ends of the string through the loop and tightening the latter.

26. In a machine of the character described, the combination with tag-feeding means and an inserter for carrying a doubled string through the tag, of means for carrying one end of a length of string across the path of movement of the inserter, a plate 142, shears 140 pivoted to said plate, a slide-bar 145, means for actutaing said bar, and links 143 connecting the said bar with the shears.

27. In a machine of the character described, the combination with tag-feeding means and an inserter for carrying a doubled string through the tag, of a pair of spreading-arms for engaging the string each side of the inserter below the tag, means for moving said arms in diverging paths to carry the loop around the edge of the tag, a slide, jaws movable along the slide and adapted to reach through the loop to grasp the ends of the string, and means for reciprocating the jaws and opening and closing them.

28. In a machine of the character described, the combination with means for passing a doubled string through a tag and carrying the loop over the edge of the tag, of a slide 148 and means for reciprocating it, grippers 154 pivoted to said slide, a lever 157 pivoted to said slide, links connecting the grippers with the lever at opposite sides of the pivot of the latter, a spring for normally holding the grippers closed, and means for operating the lever to open the grippers at each end of the movement of the slide.

29. In a machine of the character described, the combination with means for passing a doubled string through a tag and carrying the loop over the edge of the tag, of a slide 148 and means for reciprocating it, grippers 154 pivoted to said slide, a lever 157 pivoted to said slide, links connecting the grippers with the lever at opposite sides of the pivot of the latter, a spring for normally holding the grippers closed, and means for operating the lever to open the grippers at each end of the movement of the slide, said means comprising switch-cams adapted to be engaged by one end of said lever.

30. In a machine of the character described, the combination with a table and a tag-hopper, of means for feeding a tag from the hopper out upon the table, movable tag-stops for limiting the outward movement of the tag, means for stringing the tag while in contact with said stops, and means for moving said stops out of the way to permit the withdrawal of the tag.

31. In a machine of the character described, the combination with a table and a tag-hopper, of means for feeding a tag from the hopper out upon the table, a rock-shaft having arms carrying retainers to be engaged by the edge of the tag, means for stringing the tag while in contact with said retainers, and means for moving said retainers out of the way to permit the removal of the tag.

32. In a machine of the character described, the combination with a table and a tag-hopper, of means for feeding a tag from the hopper out upon the table, a rock-shaft having arms carrying retainers to be engaged by the edge of the tag, means for stringing the tag while in contact with said retainers, and means for moving said retainers out of the way to permit the removal of the tag, said means comprising an arm projecting from the rock-shaft, and a cam for actuating the last-mentioned arm.

In testimony whereof I have affixed my signature in presence of two witnesses.

FREDERICK A. SUCK.

Witnesses:
M. B. MAY,
C. C. STECHER.